US 6,335,412 B1

(12) United States Patent
Okamoto et al.

(10) Patent No.: US 6,335,412 B1
(45) Date of Patent: Jan. 1, 2002

(54) CURABLE COMPOSITION

(75) Inventors: Toshihiko Okamoto; Makoto Chiba, both of Kobe; Junji Takase, Akashi, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/485,764

(22) PCT Filed: Aug. 14, 1998

(86) PCT No.: PCT/JP98/03618

§ 371 Date: Apr. 26, 2000

§ 102(e) Date: Apr. 26, 2000

(87) PCT Pub. No.: WO99/09099

PCT Pub. Date: Feb. 25, 1999

(30) Foreign Application Priority Data

Aug. 14, 1997 (JP) .............................................. 9-219403
Apr. 7, 1998 (JP) ............................................ 10-094470

(51) Int. Cl.[7] ........................ C08L 83/08; C08G 77/08; C08G 77/24
(52) U.S. Cl. ........................... 528/18; 528/20; 528/22; 528/43; 525/100
(58) Field of Search .............................. 528/18, 20, 22, 528/43; 525/100

(56) References Cited

U.S. PATENT DOCUMENTS 4,435,536 A * 3/1984 Kato et al. ................... 524/378
4,837,401 A 6/1989 Hirose et al.

FOREIGN PATENT DOCUMENTS

EP 0 627 472 A2 12/1994
EP 0 758 029 A2 2/1997

* cited by examiner

*Primary Examiner*—Tae H. Yoon
(74) *Attorney, Agent, or Firm*—Connolly Bove Lodge & Hutz LLP.

(57) ABSTRACT

The present invention provides a curable composition comprising a reactive silicon group-containing saturated hydrocarbon polymer which features a high curing rate and a high degree of adhesiveness to various adherends. This invention is relates to a curable composition which comprises (A) a saturated hydrocarbon polymer having at least one silicon-containing group containing a hydroxyl or hydrolyzable group bound to the silicon atom and capable of forming a siloxane bond, (B) a tetravalent tin compound, and (C) a silicon compound of the general formula (1)

$$R^1_a Si(OR^2)_{4-a} \qquad (1)$$

wherein $R^1$ and $R^2$ each independently represents a substituted or unsubstituted hydrocarbon group containing 1 to 20 carbon atoms; a represents any of 0, 1, 2 and 3.

18 Claims, No Drawings

CURABLE COMPOSITION

TECHNICAL FIELD

The present invention relates to a curable composition comprising a saturated hydrocarbon polymer having a hydroxyl or hydrolyzable group bound to a silicon atom and a silicon-containing group capable of crosslinking via siloxane bonding (hereinafter referred to as "reactive silicon group").

BACKGROUND ART

A saturated hydrocarbon polymer containing at least one reactive silicon group per molecule is known to have the interesting property that the hydrolysis of the reactive silicon group in the presence of, for example, moisture and subsequent formation of a siloxane bond give a rubber-like cured product. Because its backbone chain is composed of a saturated hydrocarbon which is scarcely susceptible to degradation by heat and light, this polymer is able to give a cured product having excellent heat resistance, wheathering resistance and gas barrier properties. Therefore, the polymer can be used as a sealing material for double glazing or an elastic sealant for architectural use.

For the curing by crosslinking of the polymer containing a reactive silicon group, a silanol condensation catalyst can be used. The use of a silanol condensation catalyst reduces the necessary cure time. Double glazing, in particular, is an article of commerce which calls for an extremely short delivery term and, therefore, the sealant for double glazing is much required to be fast-curing as a quality; hence there is a demand for a potent silanol condensation catalyst.

Japanese Kokai publication Hei-8-41360 discloses a curable composition utilizing a compound of the formula $Q_2Sn(OZ)_2$ or $[Q_2Sn(OZ)]_2O$ (wherein Q represents a monovalent hydrocarbon group containing 1 to 20 carbon atoms; Z represents a monovalent hydrocarbon group containing 1 to 20 carbon atoms or an organic group internally having a functional group capable of coordinating with Sn) as a silanol condensation catalyst for expediting the cure of a saturated hydrocarbon polymer having a reactive silicon group. In the presence of such a curing catalyst, the curing reaction tends to proceed more rapidly than the reaction using a bivalent tin curing catalyst such as stannous octanoate or a tin carboxylate such as dibutyltin dilaurate. However, a further curtailment of cure time is necessary for a sealing agent for double glazing or other applications which require a very rapid curing.

As the technology utilizing an additive for accelerating the silanol condensation reaction of a reactive silicon group-containing saturated hydrocarbon polymer, Japanese Kokai publication Hei-2-97562 discloses a curable composition utilizing "a polyhydroxymonosilane such that the number of hydroxyl groups bound to silicon atom is not less than 2 per molecule" and Japanese Kokai publication Hei-2-196842 discloses a curable composition utilizing "a silicon compound other than polysiloxane, in which the number of hydroxyl groups bound to a silicon atom is not less than 2 and there are 2 or more silicon atoms per molecule". Addition of such a silanol compound leads to improved curability but the effect is not satisfactory enough; hence there is a demand for a still more effective additive.

Meanwhile, sealing agents for double glazing are required to have the ability to adhere firmly to various adherends without application of a primer, that is to say the so-called non-primer adhesiveness. Recently, not only in the field of sealing materials for double glazing but also in the field of architectural sealants, the strong non-primer adhesiveness to various adherends is required for the improvement of work efficiency. However, the use of said reactive silicon group-containing saturated hydrocarbon polymer often resulted in an inadequate non-primer adhesion.

SUMMARY OF THE INVENTION

The present invention has for its object to provide a curable composition comprising a reactive silicon group-containing saturated hydrocarbon polymer which features a high curing rate and a high degree of adhesiveness to various adherends.

The inventors of the present invention carried out investigations with due diligence for solving the above-mentioned problems and found that the curing rate and adhesiveness of a composition can be improved without adversely affecting the physical properties of the cured product by adding a determined compound to a reactive silicon group-containing saturated hydrocarbon polymer.

The present invention, therefore, is concerned with a curable composition which comprises (A) a saturated hydrocarbon polymer having at least one reactive silicon group, (B) a tetravalent tin compound and (C) a silicon compound represented by the formula

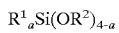

wherein $R^1$ and $R^2$ each independently represents a substituted or unsubstituted hydrocarbon group containing 1 to 20 carbon atoms; a represents any of 0, 1, 2 and 3.

The present invention is further concerned with a curable composition improved in both curing rate and adhesiveness, which comprises (A) a saturated hydrocarbon polymer containing at least one reactive silicon group per molecule and having a molecular weight of 500 to 50,000 and, based on 100 weight parts thereof, 0.1 to 20 weight parts of (B) a tetravalent tin alcoholate and/or 0.02 to 20 weight parts of (C) a silicon compound of the formula

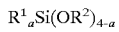

wherein $R^1$ represents an aryl group containing 6 to 20 carbon atoms; $R^2$ represents a substituted or unsubstituted hydrocarbon group containing 1 to 20 carbon atoms; and a represents any of 0, 1, 2 and 3.

DETAILED DESCRIPTION OF THE INVENTION

The present invention is now described in detail.

The saturated hydrocarbon polymer for use in the present invention is a polymer substantially not containing carbon—carbon unsaturated bond other than an aromatic ring and, as such, includes polyethylene, polypropylene, polyisobutylene, hydrogenated polybutadiene, and hydrogenated polyisoprene, among others.

As the reactive silicon group, there can be mentioned a group of the general formula (2)

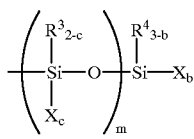
(2)

(wherein $R^3$ and $R^4$ each independently represents an alkyl group containing 1 to 20 carbon atoms, an aryl group containing 6 to 20 carbon atoms, an aralkyl group containing 7 to 20 carbon atoms, or a triorganosiloxy group of the formula $(R')_3SiO—$ (where R' groups each independently represents a substituted or unsubstituted hydrocarbon group containing 1 to 20 carbon atoms); X groups each independently represents a hydroxyl group or a hydrolyzable group; b represents any of 0, 1, 2 and 3; c represents any of 0, 1 and 2; provided, however, that both b and c are not simultaneously equal to 0; m represents an integer of 0 or 1 to 19).

As the hydrolyzable group, there can be mentioned the groups in routine use, such as hydrogen, alkoxy, acyloxy, ketoximate, amino, amido, aminooxy, mercapto and alkenyloxy, among others.

Among these, alkoxy, amido and aminooxy are preferred, although alkoxy is particularly preferred in view of its mild hydrolyzability and ease of handling.

The hydrolyzable and/or hydroxyl group may be attached, to 1 to 3 silicon atom(s), and $(a+\Sigma b)$ is preferably 1 to 5. Where 2 or more hydrolyzable and/or hydroxyl groups bind to the reactive silicon group, they may be the same kind of group or different groups.

The number of silicon atoms forming the reactive silicon group is not less than 1 and where silicon atoms are linked by siloxane bonding or the like, the number of the silicon atoms is preferably not more than 20.

Particularly, the reactive silicon group represented by the general formula (4) is preferred from the standpoint of availability.

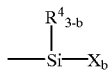
(4)

(wherein $R^4$, X and b are as defined hereinbefore)

The number of reactive silicon groups per molecule of the saturated hydrocarbon polymer is not less than 1, preferably 1.05 to 10, more preferably 1.1 to 5. If the number of reactive silicon groups per molecule is less than 1, curability will be insufficient so that a satisfactory rubber-like elasticity may not be realized.

The reactive silicon group may be located terminally and/or internally within the molecular chain of a saturated hydrocarbon polymer. Particularly, the reactive silicon group located at the terminal position within the molecule is preferred because the chain length between crosslinking sites of the saturated hydrocarbon polymer component in the cured product will then be increased so that a high-strength, high-elongation rubber-like cured product can be provided.

It should be understood that saturated hydrocarbon polymers containing such reactive silicon groups may be used each alone or in a combination of two or more species.

The polymer forming the backbone of the reactive silicon group-containing saturated hydrocarbon polymer to be used for the present invention can be obtained by (1) polymerizing an olefinic compound having 1 to 6 carbon atoms, such as ethylene, propylene, 1-butene, isobutylene or the like, as a predominant monomer or (2) homo- or copolymerizing diene compounds, such as butadiene, isoprene or the like, or copolymerizing a diene compound with said olefinic compound(s) and hydrogenating the resulting copolymer. Isobutylene and hydrogenated polybutadiene polymers are preferred because they are more amenable to the introduction of a functional group into the terminus and easy to control its molecular weight and, in addition, the number of terminal functional groups can be increased.

The isobutylene polymer may be exclusively comprised of the isobutylene unit or may contain a monomer unit(s) copolymerizable with isobutylene up to the limit of preferably not more than 50% (weight %; the same applies hereinafter), more preferably not more than 30%, still more preferably not more than 10%.

As such monomer units, there can be mentioned olefins containing 4 to 12 carbon atoms, vinyl ethers, aromatic vinyl compounds, vinylsilanes and allylsilanes, among others. As such copolymerizable component, there can be mentioned 1-butene, 2-butene, 2-methyl-1-butene, 3-methyl-1-butene, pentene, 4-methyl-1-pentene, hexene, vinylcyclohexene, methyl vinyl ether, ethyl vinyl ether, isobutyl vinyl ether, styrene, α-methylstyrene, dimethylstyrene, monochlorostyrene, dichlorostyrene, β-pinene, indene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, diallyldimethylsilane, γ-methacryloyloxypropyltrimethoxysilane, and γ-methacryloyloxypropylmethyldimethoxysilane.

When a vinylsilane or an allylsilane is used as said monomer copolymerizable with isobutylene, a group capable of functioning as a silane coupling agent can be introduced into the polymer so that the adhesiveness of the resulting composition can be improved.

In the hydrogenated polybutadiene polymer and other saturated hydrocarbon polymers, too, a vinylsilane or allylsilane compound can be incorporated in addition to the predominant monomer unit just as in the case of said isobutylene polymer.

The isobutylene polymer having a reactive silicon group for use in the present invention may contain a monomer unit which leaves a double bond after polymerization, such as a polyene compound, e.g. butadiene or isoprene, in a small amount within the range capable of accomplishing the object of the invention, i.e. preferably not more than 10%, more preferably not more than 5%, particularly not more than 1%.

The number average molecular weight of the saturated hydrocarbon polymer, preferably said isobutylene polymer or hydrogenated polybutadiene polymer, is preferably about 500 to 50,000, and polymers within the molecular weight range of about 1,000 to 30,000, which are either liquid or fluid, are more preferred from the standpoint of ease of handling.

The process for producing the reactive silicon group-containing saturated hydrocarbon polymer is now described.

Among isobutylene polymers having a reactive silicon group, an isobutylene polymer having a reactive silicon group at the molecular chain terminus can be produced using a polymer having a terminal functional group obtainable by the polymerization technique known as the inifer method (a cation polymerization method using a compound called "inifer" which doubles as an initiator and a chain transfer agent), preferably an isobutylene polymer having functional groups at all termini. Thus, an isobutylene polymer having a reactive silicon group can be obtained by the terminal dehydrohalogenation reaction of a polymer having a tertiary carbon-chlorine bond as obtained by a polymerization reaction or the terminal reaction of a polymer having a tertiary carbon-chlorine bond with allyltrimethylsilane to give a polyisobutylene having an unsaturated group terminally and subsequent addition reaction between the terminal unsaturated group and a hydrosilane compound of the general formula

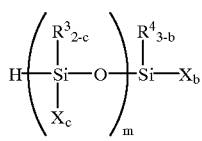

(wherein $R^3$, $R^4$, X, b, c and m are as defined hereinbefore) [this compound is a compound corresponding to the group of the general formula (2) to which a hydrogen atom has been attached], preferably a hydrosilane compound of the general formula

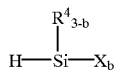

(wherein $R^4$, X and b are as defined hereinbefore) by using a platinum catalyst.

As the hydrosilane compound, there can be mentioned halogenated silanes such as trichlorosilane, methyldichlorosilane, dimethylchlorosilane, phenyldichlorosilane; alkoxysilanes such as trimethoxysilane, triethoxysilane, methyldiethoxysilane, methyldimethoxysilane, phenyldimethoxysilane, etc.; acyloxysilanes such as methyldiacetoxysilane, phenyldiacetoxysilane, etc.; and ketoxime silanes such as bis(dimethylketoximate)methylsilane, bis(cyclohexylketoximate) methylsilane, etc. Among these, halogenated silanes and alkoxysilanes are preferred.

Such production processes are described, for example, in Japanese Kokoku Publication Hei-4-69659, Japanese Kokoku Publication Hei-7-108928, Japanese Kokai Publication Sho-63-254149, Japanese Kokai Publication Sho-64-22904, and Japanese Patent Publication 2539445.

The isobutylene polymer having a reactive silicon group internally within its molecular chain can be produced by adding a vinylsilane or allylsilane having a reactive silicon group to an isobutylene-containing monomer and carrying out a copolymerization reaction.

Furthermore, an isobutylene polymer having reactive silicon groups both terminally and internally within its molecular chain can be produced by copolymerizing a vinylsilane or allylsilane having a reactive silicon group with an isobutylene monomer as a main component in the process for production of an isobutylene polymer having a terminal reactive silicon group and, then, introducing a reactive silicon group into the terminus of the resulting copolymer.

As the vinylsilane or allylsilane having a reactive silicon group, there may be mentioned vinyltrichlorosilane, vinylmethyldichlorosilane, vinyldimethylchlorosilane, vinyldimethylmethoxysilane, divinyldichlorosilane, divinyldimethoxysilane, allyltrichlorosilane, allylmethyldichlorosilane, allyldimethylchlorosilane, allyldimethylmethoxysilane, diallyldichlorosilane, diallyldimethoxysilane, γ-methacryloyloxypropyltrimethoxysilane, and γ-methacryloyloxypropylmethyldimethoxysilane, among others.

Furthermore, as a further saturated hydrocarbon polymer having a reactive silicon group, other than said isobutylene polymer, a hydrogenated polybutadiene polymer having a reactive silicon group can be mentioned. The hydrogenated polybutadiene polymer having a reactive silicon group can be obtained by the hydrosilylation reaction of a hydrogenated polybutadiene polymer having an olefin group. The hydrogenated polybutadiene polymer having a terminal olefin group can be obtained by converting the hydroxyl group of a hydroxy-terminated hydrogenated polybutadiene polymer to an oxymetal group such as —ONa or —OK in the first place and reacting it with an organohalogen compound of the general formula (5):

[wherein Y represents a halogen atom such as chloride atom, bromide atom, or iodine atom; $R^5$ represents a divalent organic group of the formula —$R^6$—, —$R^6$—OCO— or —$R^6$—CO— (where $R^6$ represents a divalent hydrocarbon group containing 1 to 20 carbon atoms, preferably an alkylene, cycloalkylene, arylene or aralkylene group), more preferably a divalent group selected from the class consisting of —$CH_2$— and —R"—$C_6H_4$—$CH_2$— (R" represents a hydrocarbon group of 1 to 10 carbon atoms)].

Conversion of the terminal hydroxyl group of the hydroxy-terminated hydrogenated polybutadiene polymer to an oxymetal group may for example be achieved by the reaction with an alkali metal, such as Na, K or the like; a metal hydride, such as NaH; a metal alkoxide, such as $NaOCH_3$; or an alkali metal hydroxide, such as NaOH, KOH or the like.

By said method, an olefin-terminated hydrogenated polybutadiene polymer having a molecular weight close to that of the starting material hydroxy-terminated hydrogenated polybutadiene polymer is obtained. When a polymer having a higher molecular weight is to be produced, a polyvalent organohalogen compound containing 2 or more halogen atoms per molecule, such as methylene chloride, bis(chloromethyl)benzene, bis(chloromethyl)ether or the like, can be reacted prior to the reaction of said organohalogen compound of the general formula (5), whereby the molecular weight can be increased. By reacting the organohalogen compound of the general formula (5) thereafter, an olefin-terminated hydrogenated polybutadiene polymer having a greater molecular weight can be provided.

As a specific example of the organohalogen compound of the general formula (5), there can be mentioned allyl chloride, allyl bromide, vinyl(chloromethyl)benzene, allyl (chloromethyl)benzene, allyl(bromomethyl)benzene, allyl (chloromethyl)ether, allyl(chloromethoxy)benzene, 1-butenyl(chloromethyl)ether, 1-hexenyl-(chloromethoxy) benzene and allyloxy(chloromethyl)benzene. Among those compounds, allyl chloride is preferred because it is readily available and highly reactive.

As a method for introducing a reactive silicon group into said olefin-terminated hydrogenated polybutadiene polymer, a hydrosilylation reaction, like that mentioned for the production of an isobutylene polymer having a terminal reactive silicon group can be employed.

When the saturated hydrocarbon polymer having a reactive silicon group does not substantially contain any unsaturated bond other than an aromatic ring, a marked improvement in weathering resistance can be obtained as compared with sealants based on the conventional rubber-like polymers such as the unsaturated bond-containing organic polymers and oxyalkylene polymers. Moreover, being a hydrocarbon polymer, said polymer gives a cured product having good water resistance and low moisture permeability.

The proportion of the reactive silicon group-containing saturated hydrocarbon polymer in the curable composition of the present invention is preferably not less than 10%, more preferably not less than 20%, still more preferably not less than 30%.

As the component (B) of the curable composition of the present invention, a tetravalent tin compound, which is a silanol condensation catalyst having high activity, is employed.

As the tetravalent tin compound mentioned above, there can be mentioned tin carboxylates, dialkyltin oxides, and compounds of the general formula (3)

$$Q_d Sn(OZ)_{4-d} \text{ or } [Q_2Sn(OZ)]_2O \quad (3)$$

(wherein Q represents a monovalent hydrocarbon group containing 1 to 20 carbon atoms; Z represents a monovalent hydrocarbon group containing 1 to 20 carbon atoms or an organic group internally containing a carbonyl group; d represents any of 0, 1, 2 and 3). In addition, the reaction product obtainable by reacting a tetravalent tin compound, such as a dialkyltin oxide, a dialkyltin diacetate or the like, with a low molecular weight silicon compound having a hydrolyzable silicon group, such as tetraethoxysilane, methyltriethoxysilane, diphenyldimethoxysilane, phenyltrimethoxysilane, or the like is also an effective curing catalyst capable of accelerating the silanol condensation reaction in a remarkable measure. Among these compounds, compounds of the general formula (3), namely chelate compounds, such as dibutyltin bisacetylacetonate, and tin alcoholates are preferred because of their high activity as silanol condensation catalysts. Particularly, the use of a tin alcoholate is preferred because the curing rate of the curable composition of the present invention is then dramatically increased and a sufficiently long pot life (the time allowable for the field work such as spatula-finishing after admixing of the main component with the curing agent) is also assured.

As the tin carboxylates mentioned above, there can be mentioned dibutyltin dilaurate, dibutyltin diacetate, dibutyltin diethylhexanoate, dibutyltin dioctanoate, dibutyltin dimethylmalate, dibutyltin diethylmalate, dibutyltin dibutylmalate, dibutyltin diisooctylmalate, dibutyltin ditridecylmalate, dibutyltin dibenzylmalate, dibutyltin meleate, dioctyltin diacetate, dioctyltin distearate, dioctyltin dilaurate, dioctyltin diethylmalate, and dioctyltin diisooctylmalate.

As the dialkyltin oxide mentioned above, there can be mentioned dibutyltin oxide, dioctyltin oxide, and a mixture of dibutyltin oxide and a phthalic ester, among others.

As a specific example of the chelate compound mentioned above, there can be mentioned the following compounds;

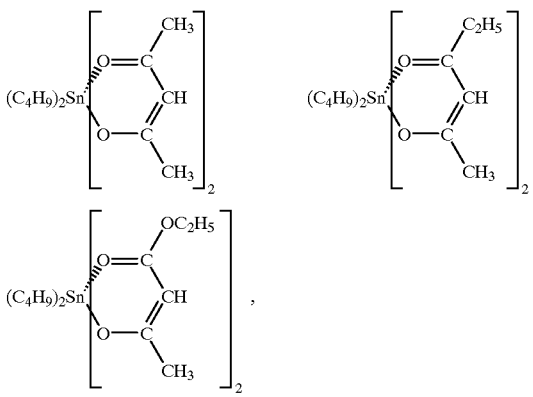

however it is not limited to these compounds.

As a specific example of the tin alcoholate mentioned above, there can be mentioned the following compounds;

$(C_4H_9)_3SnOCH_3$ $(C_4H_9)_2Sn(OCH_3)_2$ $C_4H_9Sn(OCH_3)_3$ $Sn(OCH_3)_4$ $(C_4H_9)_2Sn(OC_3H_7)_2$ $(C_4H_9)_2Sn(OC_4H_9)_2$ $(C_4H_9)_2Sn(OC_8H_{17})_2$ $(C_4H_9)_2Sn(OC_{12}H_{25})_2$ $(C_8H_{17})_2Sn(OCH_3)_2$

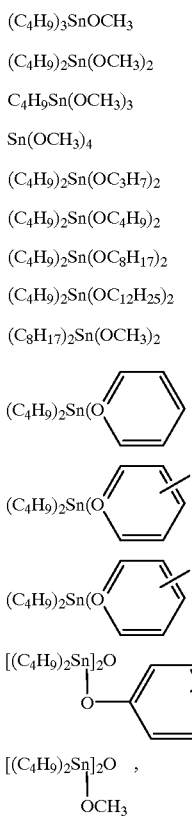

however it is not limited to these compounds.

Among these, dialkyltin dialkoxides are preferred. Dibutyltin dimethoxide, in particular, is most preferred in view of its high effectiveness and availability.

The component (B) in the present invention functions as a silanol condensation catalyst, and insofar as the object of the present invention can be accomplished, it may be used in combination with other silanol condensation catalysts. As such silanol condensation catalysts, there can be mentioned titanic esters such as tetrabutyl titanate, tetrapropyl titanate, etc.; organoaluminum compounds such as aluminum trisacetylacetonate, aluminum trisethylacetoacetate, diisopropoxyaluminum ethylacetoacetate, etc.; chelate compounds such as zirconium tetraacetylacetonate, titanium tetraacetylacetonate, etc.; lead octoate; amine compounds such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo(5.4.0)undecene-7 (DBU), etc., salts of such amine compounds with a carboxylic acid or the like; the low molecular weight polyamide resin obtainable from an excess of a polyamine and a polybasic acid; the reaction product of an excess of a polyamine with an epoxy compound; amino-containing silane coupling agents such as γ-aminopropyltrimethoxysilane, N-(β-aminoethyl) aminopropylmethyldimethoxysilane, etc.; and other known silanol condensation catalysts inclusive of acid catalysts and basic catalysts, among others.

Those catalysts can be used each alone or in a combination of two or more species.

The formulating amount of said tetravalent tin compound as component (B) is preferably about 0.1 to 20 parts, more preferably 1 to 10 parts, relative to 100 parts of the saturated hydrocarbon polymer as component (A) (said parts are all by weight; the same applies hereinafter). If the formulating amount of said silanol condensation catalyst is below the above-specified range, the curing rate may decrease and the curing reaction will not proceed sufficiently in some instances. On the other hand, if the formulating amount of said silanol condensation catalyst exceeds this range, local generation of heat or foaming tends to take place in the course of curing so that a satisfactory cured product will hardly be obtained and, in addition, the pot life will be curtailed to interfere with field work.

For insuring a further enhancement of activity of the silanol condensation catalyst, an alkoxysilyl group-containing silicon compound of the general formula (1) is used as component (C) in the curable composition of the present invention.

$$R^1_a Si(OR^2)_{4-a} \quad (1)$$

(wherein $R^1$ and $R^2$ each independently represents a substituted or unsubstituted hydrocarbon group containing 1 to 20 carbon atoms; a represents any of 0, 1, 2 and 3). The silicon compound of the general formula (1) has no silanol group. In this respect, the present invention is different from the inventions disclosed in Japanese Kokai publication Hei-2-97562 and Japanese Kokai publication Hei-2-196842 where silanol compounds are employed. It is generally acknowledged that a silanol group is higher in reactivity than an alkoxysilyl group and, for this reason, it has been thought that silanol compounds are preferred as cure accelerators. However, various investigations made by the present inventors revealed surprisingly that the above compound of the general formula (1) functions as an effective cure accelerator. One of the unique characteristics of the present invention resides in that such a compound as had not been considered to be an effective cure accelerator was found to be an effective cure accelerator to anybody's surprise.

As a specific example of the silicon compound mentioned above, there can be mentioned the following specific compounds;

| | |
|---|---|
| $(CH_3)_3SiOCH_3$ | $(CH_3)_2Si(OCH_3)_2$ |
| $(CH_3)_3SiOC_2H_5$ | $(CH_3)_2Si(OC_2H_5)_2$ |
| $(CH_3)_3SiOC_6H_5$ | $(CH_3)_2Si(OC_6H_5)_2$ |
| $(C_6H_6)_3SiOCH_3$ | $(C_6H_5)_2Si(OCH_3)_2$ |
| $(C_6H_5)_3SiOC_2H_5$ | $(C_6H_5)_2Si(OC_2H_5)_2$ |
| $(C_6H_5)_3SiOC_6H_5$ | $(C_6H_5)_2Si(OC_6H_5)_2$ |
| $CH_3Si(OCH_3)_3$ | $C_6H_5Si(OCH_3)_3$ |
| $CH_3Si(OC_2H_5)_3$ | $C_6H_5Si(OC_2H_5)_3$ |
| $CH_3Si(OC_6H_5)_3$ | $C_6H_5Si(OC_6H_5)_3$ |
| $C_6H_5Si(CH_3)(OCH_3)_2$ | $(C_6H_5)_2Si(CH_3)(OC_6H_5)$ |
| $C_6H_5Si(CH_3)_2(OCH_3)$ | $(C_6H_5)_2Si(CH_3)(OCH_3)$ |
| $(C_6H_5)_2Si(OC_4H_9)_2$ | $(C_4H_9)_2Si(OC_6H_5)_2$ |
| $(C_6H_5)_2Si(OC_8H_{17})_2$ | $(C_8H_{17})_2Si(OC_6H_5)_2$ |
| $(C_6H_5)_2Si(OC_{12}H_{25})_2$ | $(C_{12}H_{25})_2Si(OC_6H_5)_2$ |
| $(CH_3)_2Si(OC_4H_9)_2$ | $(C_2H_5)_3SiOCH_3$ |
| $(CH_3)_2Si(OC_8H_{17})_2$ | $(C_2H_5)_2Si(OCH_3)_2$ |
| $(CH_3)_2Si(OC_{12}H_{25})_2$ | $C_2H_5Si(OCH_3)_3$ |

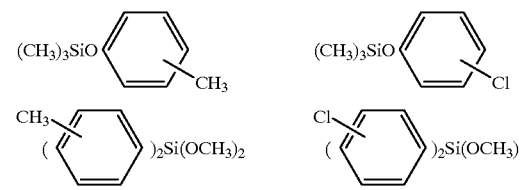

however it is not limited to these compounds.

Among these, the compounds of the general formula (1) in which $R^1$ is an aryl group having 6 to 20 carbon atoms, such as phenyltrimethoxysilane, phenylmethyldimethoxysilane, phenyldimethylmethoxysilane, diphenyldimethoxysilane, diphenyldiethoxysilane, triphenylmethoxysilane, etc. are preferred because of their high activity to accelerate the curing reaction of the composition. Particularly, diphenyldimethoxysilane and diphenyldiethoxysilane, which are inexpensive and readily available, are most preferred.

The formulating amount of this silicon compound as component (C) is preferably about 0.01 to 20 parts, more preferably 0.1 to 10 parts, relative to 100 parts of said saturated hydrocarbon polymer as component (A). If the formulating amount of the silicon compound is below this range, the cure accelerating effect will at times be decreased. On the other hand, if the formulating amount of said silicon compound exceeds this range, the hardness and tensile strength of the cured product are at times sacrificed.

The isocyanato-containing silane coupling agent as component (D) in the present invention is intended to enhance the adhesiveness between the adherend or substrate and the cured product of the reactive silicon group-containing saturated hydrocarbon polymer. The isocyanato-containing silane coupling agent is a compound having a group containing a silicon atom bound to a hydrolyzable group (hereinafter referred to as hydrolyzable silicon group) and an isocyanate group. As an example of said hydrolyzable silicon group, the group of the general formula (2) in which X is a hydrolyzable group can be mentioned. Specifically, the groups named hereinbefore as hydrolyzable groups can be mentioned but from the standpoint of the rate of hydrolysis, methoxysilyl, ethoxysilyl, etc. are preferred. The number of hydrolyzable groups is preferably not less than 2, more preferably not less than 3.

As the isocyanato-containing silane coupling agent mentioned above, there can be mentioned isocyanato-containing silanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane and so forth.

The composition of the present invention may further comprise a silane coupling agent(s) other than said isocyanato-containing silane coupling agent as well as an tackifier other than silane coupling agents.

As a specific example of the silane coupling agents other than said isocyanato-containing silane coupling agent, there can be mentioned amino-containing silanes such as γ-aminopropyltrimethoxysilane, γ-aminopropyltriethoxysilane, γ-aminopropylmethyldimethoxysilane, γ-aminopropylmethyldiethoxysilane, γ-(2-aminoethyl) aminopropyltrimethoxysilane, γ-(2-aminoethyl) aminopropylmethyldimethoxysilane, γ-(2-aminoethyl) aminopropyltriethoxysilane, γ-(2-aminoethyl) aminopropylmethyldiethoxysilane, γ-ureidopropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, etc.; mercapto-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane, etc.; epoxy-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, β-(3,4-epoxycyclohexyl)ethyltriethoxysilane, etc.; carboxysilanes such as β-carboxyethyltriethoxysilane, β-carboxyethylphenylbis(2-methoxyethoxy)silane, N-β-(carboxymethyl)aminoethyl-γ-aminopropyltrimethoxysilane, etc.; vinyl unsaturated bond-containing silanes such as vinyltrimethoxysilane, vinyltriethoxysilane, γ-methacryloyloxypropylmethyldimethoxysilane, γ-acryloyloxypropylmethyltriethoxysilane, etc.; halogen-containing silanes such as γ-chloropropyltrimethoxysilane etc.; and isocyanurate silanes such as tris(trimethoxysilyl) isocyanurate and so froth. In addition, the modification derivatives of these compounds, such as amino-modified silyl polymers, silylated amino-containing polymers, unsaturated aminosilane complexes, phenylamino-long chain alkyl-silanes, aminosilylated silicones, silylated polyesters, etc. can also be used as silane coupling agents.

The isocyanato-containing silane coupling agent for use in the present invention is generally used in a proportion of 0.1 to 20 parts relative to 100 parts of the reactive silicon group-containing saturated hydrocarbon polymer. The preferred range is 0.5 to 10 parts. The isocyanato-containing silane coupling agents mentioned above may be used each alone or in a combination of two or more species.

The effect of the isocyanato-containing silane coupling agent formulated in the curable composition of the present invention is that when the composition is applied to various adherends, namely inorganic substrates such as glass, aluminum, stainless steel, zinc, copper, mortar, etc. and organic substrates such as polyvinyl chloride, acryl, polyester, polyethylene, polypropylene, polycarbonate, etc., it brings about a marked improvement in adhesiveness, whether under non-primer conditions or under primer conditions. When it is used under non-primer conditions, the adhesiveness-improving effect with respect to various adherends is particularly remarkable.

In the curable composition of the present invention, various fillers are used where necessary. As a specific example of the fillers, there can be mentioned wood meal, pulp, cotton chip, asbestos, glass fiber, carbon fiber, mica, walnut shell flour, rice hull flour, graphite, diatomaceous earth, China clay, fumed silica, precipitated silica, crystalline silica, fused silica, dolomite, silicic anhydride, carbon black, calcium carbonate, clay, talc, titanium oxide, magnesium carbonate, aluminum dust, flint powder, zinc powder, etc. Among these fillers, precipitated silica, fumed silica, crystalline silica, fused silica, dolomite, carbon black, calcium carbonate, titanium oxide and talc are preferred. Those fillers can be used each alone or in a combination of two or more species. The proportion of the filler, if used, is preferably 10 to 1000 parts, more preferably 50 to 300 parts, relative to 100 parts of component (A).

The curable composition of the present invention is supplemented with various additives where necessary.

As an example of the additives mentioned above, there can be mentioned a modifier for adjusting the tensile characteristics of the cured product, a plasticizer, an antioxidant, a radical chain terminator, an ultraviolet absorber, a sequestrant, an ozone degradation inhibitor, a light stabilizer, a phosphorus type peroxide decomposer, a lubricant, a pigment, a blowing agent, a photocurable resin and a thixotropic agent.

The specific additive substances are described in the specifications of Japanese Kokoku Publication Hei-4-69659, Japanese Kokoku Publication Hei-7-108928, Japanese Kokai Publication Sho-63-254149 and Japanese Kokai Publication Sho-64-22904, among other publications.

The curing-improving effect attributable to the combined use of the tetravalent tin compound and the silicon compound of the general formula (1) in accordance with the present invention is expressed equally regardless of the presence or absence of the isocyanato-containing silane coupling agent as component (D) of the present invention. Moreover, this curing-improving effect is obtained when said various additives are added as well. Thus, in the application of the curable composition of the present invention as an architectural elastic sealant, a sealant for double glazing, an electric/electronic component sealant such as a solar battery back sealant or an electrical insulation, e.g. a conductor or cable sheathing, a pressure sensitive adhesive, an adhesive, or a rust preventive/water proof sealant for wire-mesh glass or double glazing edge (a section) treatment, the curing rate of such curable materials can be dramatically increased.

BEST MODE FOR CARRYING OUT THE INVENTION

The following examples and comparative examples are further illustrative of the present invention but by no means limitative of the scope of the present invention.

Production Example 1

A 500 ml pressure-resisting glass vessel was fitted with a three-way cock and after the air within the vessel was purged with nitrogen gas, 54 ml of ethylcyclohexane (dried in the presence of molecular sieve 3A at least overnight), 126 ml of toluene (dried in the presence of molecular sieve 3A at least overnight) and 1.16 g (5.02 mmol) of p-DCC (the compound indicated below) were added using a syringe.

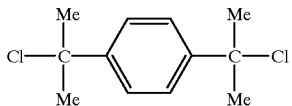

Then, a pressure-resisting glass liquefied gas sampling tube having a needle valve, which was filled with 56 ml of isobutylene monomer ahead of time, was connected to the three-way cock and the polymerization vessel was cooled in a dry ice-ethanol bath at −70° C. Then, using a vacuum pump, the internal pressure of the vessel was decreased. The needle valve was then opened to allow the isobutylene monomer in the liquefied gas sampling tube to flow into the polymerization vessel and, thereafter, the internal pressure of the vessel was brought back to atmospheric pressure by introducing nitrogen gas from another port of the three-way cock. Then, 0.093 g (1.0 mmol) of 2-methylpyridine was added, further followed by addition of 1.65 ml (15.1 mmol) of titanium tetrachloride to initiate polymerization. After 70 minutes of polymerization reaction, 1.22 g (10.8 mmol) of allyltrimethylsilane was added for introduction of an allyl group into the terminal position of the polymer. At 120 minutes of reaction, the reaction mixture was washed with 200 ml of water 4 times and the solvent was then distilled off to give an allyl-terminated isobutylene polymer.

Then, 40 g of the allyl-terminated isobutylene polymer was dissolved in 20 ml of n-heptane, and after the temperature was raised to about 70° C., 1.5 [eq/vinyl group] of methyldimethoxysilane and $1 \times 10^{-4}$ [eq/vinyl] of platinum (vinylsiloxane) complex were added for a hydrosilylation reaction. The reaction was monitored by FT-IR. The absorption of olefin at 1640 cm$^{-1}$ had disappeared in about 4 hours.

This reaction mixture was concentrated under reduced pressure to provide an isobutylene polymer having a reactive silicon group at both termini [the compound indicated below].

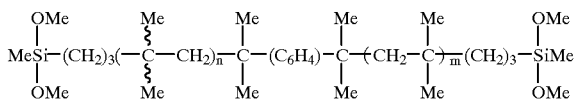

The yield was calculated from the amount of the polymer obtained and the Mn and Mw/Mn values of the polymer were determined by GPC. The terminal structure was determined by 300 MHz $^1$H-NMR analysis, namely measuring the resonance signals of the protons assignable to the respective structural moieties (protons derived from the initiator: 6.5 to 7.5 ppm, methyl protons bound to silicon atom derived from the polymer terminus: 0.0 to 0.1 ppm, and methoxy protons: 3.4 to 3.5) and comparing the relative signal intensities. The $^1$H-NMR data were generated in CDCl$_3$ using Varian Gemini 300 (300 MHz for $^1$H).

The FT-IR analysis was made using Shimadzu IR-408, manufactured by Shimadzu Corporation, and GPC was carried out using Waters LC Module-1 as a liquid delivery system and Shodex K-804 as the column. The molecular weight is the polystyrene equivalent molecular weight relative to polystyrene standard. The analytical values of the polymer were Mn=11400, Mw/Mn=1.23, and Fn (silyl)= 1.76. (The number average molecular weight shown is the polystyrene equivalent value and the number of terminal silyl functional groups is the number per molecule of the isobutylene polymer).

Production Example 2

Except that the addition amount of p-DCC was changed to 2.32 g (10.0 ml) and that of allyltrimethylsilane to 14.4 g (126.0 mmol), the procedure of Production Example 1 was otherwise repeated to synthesize a reactive silicon group-containing isobutylene polymer.

The analytical values of the polymer were Mn=5780, Mw/Mn=1.28, and Fn (silyl)=1.93.

EXAMPLES 1 AND 2 and

Comparative Examples 1 to 4

To each 100 parts of the polymer obtained in Production Example 1 as the saturated hydrocarbon polymer for the component (A) of the present invention, 90 parts of paraffinic process oil (Idemitsu Kosan, product designation: Diana Process PS-32), 180 parts of heavy calcium carbonate (Shiraishi Calcium, product designation: PO320B10), 50 parts of calcium carbonate gel (Shiraishi Kogyo, product designation: EDS-D10A), 100 parts of talc (Fuji Talc Kogyo, product designation: Talc LMR), 3 parts of the light stabilizer nickel dimethyldithiocarbamate (Sanshin Kagaku, product designation: Sandant NBC), 5 parts of antisagging agent (Kusumoto Kasei, product designation: Disparlon #305), 1 part of hindered phenol antioxidant (Ciba-Geigy, Japan, product designation: Irganox 1010), 1 part of salicylate UV absorber (Sumitomo Chemical, product designation: Sumisorb 400), 1 part of hindered amine light stabilizer (Sankyo Co., product designation: Sanol LS-765), 3 parts of the photocurable substance dipentaerythritol penta/hexaacrylate (Toa Gosei, product designation: Aronix M-400), 2 parts of γ-glycidoxypropyltrimethoxysilane (Nippon Unicar, product designation: Silane Coupling Agent A-187), 4 parts of γ-isocyanatopropyltriethoxysilane (Nippon Unicar, product designation: Silane Coupling Agent A-1310) as the isocyanato-containing silane coupling agent for the component (D) of the present invention, and the silicon compound shown in Table 1 were added and the mixture was thoroughly kneaded with a 3-roll paint kneader to provide a main component.

Here, as the silicon compound not containing a silanol group for component (C) according to the present invention, diphenyldimethoxysilane (Shin-Etsu Chemical, product designation: LS-5300) was added in the number of parts shown in Table 1 as Examples 1 and 2 and Comparative Example 1; addition of the silicon compound was omitted in Comparative Example 2, and diphenyldisilanol (Chisso Corporation, product designation: D6150) as a silanol group-containing silicon compound was added in the number of parts indicated in Table 1 as Comparative Examples 3 to 4.

On the other hand, 16 parts of paraffinic process oil (Idemitsu Kosan, Diana Process PS-32), 10 parts of heavy calcium carbonate (Maruo Calcium, product designation: Snowlite SS), 2.5 parts of carbon black (Mitsubishi Chemical, product designation: CB #30), 2 parts of H$_2$O, and a silanol condensation catalyst were added in the number of parts indicated in Table 1, and manually kneaded in a disposable cup and using the Excel Auto Homogenizer (manufactured by Nippon Seiki), the mixture was subjected to 3 cycles of stirring at 10000 rpm for 10 minutes each to provide a curing agent.

Here, as the silanol condensation catalyst, 4 parts of dibutyltin dimethoxide (Aldrich Chemical), as the tetravalent tin compound for component (B) of the present invention, was added in Examples 1 and 2 and Comparative Examples 2 to 4 and 4 parts of stannous octanoate (Nitto Kasei, product designation U-28), which is a divalent tin compound, was added in Comparative Example 1.

The curability was evaluated by admixing said main component with said curing agent and monitoring the hardness of the cured product. Samples for the measurement of hardness were prepared by weighing out the main component and curing agent in a weight ratio of 16:1, mix-kneading them thoroughly, filling the kneaded mixture into a 12×12×50 mm casting flask lined with a Teflon sheet, and curing the mixture in an incubator at 25° C. Using a cubic sample thus obtained, the hardness of the cured product was measured at 25° C. using Shimadzu Rubber Hardness Tester Model 200 manufactured by Shimadzu Corporation in accordance with the spring type hardness test A as directed in JIS K6301-1975. Thus, the period of time immediately following mix-kneading of the main component and curing agent till attainment of a hardness value of 20 was measured. The results are shown in Table 1.

TABLE 1

| No. | Silanol condensation catalyst (in parts) | Silicon compound (in parts) | Time to hardness 20 (hrs) |
|---|---|---|---|
| Ex. 1 | $(C_4H_9)_2Sn(OCH_3)_2$ (4 parts) | $(C_6H_5)_2Si(OCH_3)_2$ (0.5 parts) | 2.1 |
| Ex. 2 | $(C_4H_9)_2Sn(OCH_3)_2$ (4 parts) | $(C_6H_5)_2Si(OCH_3)_2$ (1.0 parts) | 2.0 |
| Compar. ex. 1 | $Sn(OCOC_7H_{15})_2$ (4 parts) | $(C_6H_5)_2Si(OCH_3)_2$ (0.5 parts) | >12 |
| Compar. ex. 2 | $(C_4H_9)_2Sn(OCH_3)_2$ (4 parts) | none (0 part) | 4.0 |
| Compar. ex. 3 | $(C_4H_9)_2Sn(OCH_3)_2$ (4 parts) | $(C_6H_5)_2Si(OH)_2$ (0.5 parts) | 3.8 |
| Compar. ex. 4 | $(C_4H_9)_2Sn(OCH_3)_2$ (4 parts) | $(C_6H_5)_2Si(OH)_2$ (1.0 parts) | 3.5 |

It will be apparent from Table 1 that when stannous octanoate, i.e. a divalent tin curing catalyst, was used as silanol condensation catalyst (Comparative Example 1), the curability was poor with the time to hardness value 20 being as long as more than 12 hours. When dibutyltin dimethoxide, i.e. a tetravalent tin curing catalyst, was used as silanol condensation catalyst and the addition of the silicon compound was omitted (Comparative Example 2), the time to hardness value 20 was reduced to 4 hours, indicating an improved curability as compared with Comparative Example 1, but this curability was insufficient in applications calling for delivery on very short notice. When dibutyltin dimethoxide was used as silanol condensation catalyst and 0.5 or 1 part of diphenyldisilanol, which is a silanol group-containing silicon compound, was added (Comparative Examples 3 and 4), the times to hardness 20 were 3.8 hours and 3.5 hours, respectively, indicating little curing-improving effect compared with Comparative Example 2. When dibutyltin dimethoxide was used as silanol condensation catalyst and 0.5 or 1 part of diphenyldimethoxysilane, as the silicon compound for component (C) of the present invention, was added (Examples 1 and 2), the time to hardness value 20 was reduced to 2.1 hours and 2 hours, respectively, indicating a marked curing-improving effect as compared with Comparative Example 2.

EXAMPLE 3 and

Comparative Example 5

To 100 parts of the polymer obtained in Production Example 2, as the saturated hydrocarbon polymer for component (A) of the present invention, 30 parts of paraffinic process oil (Idemitsu Kosan, Diana Process PS-32), 70 parts of the ester series plasticizer dioctyl adipate (Shin-Nippon Rika, product designation: Sansocizer DOA), 100 parts of fused silica (Tatsumori Co., product designation: Fuselex E-1), 2 parts of $H_2O$, and, as the silanol group-free silicon compound for component (C) of the present invention, diphenyldimethoxysilane (Shin-Etsu Chemical, product designation: LS-5300) in the number of parts indicated in Table 2 were added and, using a three-roll paint kneader, the mixture was thoroughly kneaded to provide a main component.

For the evaluation of curability, the above main component and the curing catalyst dibutyltin bisacetylacetonate (Nitto Kasei, product designation: Neostan U-220) were mix-kneaded in a weight ratio of 75:1 and the hardness of the cured product was monitored in the same manner as described above. The results are shown in Table 2.

TABLE 2

| No. | Silanol condensation catalyst (in parts) | Silicon compound (in parts) | Time to hardness 10 (hrs) |
|---|---|---|---|
| Ex. 3 | $(C_4H_9)_2Sn(acac)_2$ (4 parts) | $(C_6H_5)_2Si(OCH_3)_2$ (0.5 parts) | 0.9 |
| Compar. ex. 5 | $(C_4H_9)_2Sn(acac)_2$ (4 parts) | none (0 part) | 1.8 |

It is apparent from Table 2 that when 0.5 part of diphenyldimethoxysilane was added (Example 3), the time to a hardness value of 10 was reduced to 0.9 hour, indicating a marked curing-improving effect compared with Comparative Example 5 in which diphenyldimethoxysilane was not added (the time to the hardness value of 10 was 1.8 hours).

EXAMPLES 4 AND 5 and

Comparative Example 6

The adhesiveness-improving effect of the isocyanato-containing silane coupling agent as the component (D) of the present invention was evaluated by the following adhesion test. Samples for the adhesion test were prepared in accordance with the protocol for preparation of a tensile strength testpiece as directed in JIS A5758-1992. Thus, using sheet glass, an H-shaped flask was constructed. Separately, the main component and curing agent obtained in Example 1, as Example 4, and the main component and curing agent obtained in Example 2, as Example 5, were respectively weighed out in a weight ratio of 16:1 and thoroughly mix-kneaded. Each formulation was poured with the entrained air bubbles being collapsed with a spatula and caused to cure in an oven. The curing condition was 23° C.×7 days+50° C.×7 days in either case. As the substrate for the H-tensile test, an aluminum sheet conforming to JIS H4000 (Taiyu Kizai, A1100P, size: 3×5×0.2 cm) was used. The adherend was washed with methyl ethyl ketone (Wako Pure Chemical Ind.; special grade) and wiped with a clean cotton cloth before pouring of the formulation. Primer coating was not performed.

As Comparative Example 6, the adhesive test was performed in the same manner as in Example 4 except that the addition of γ-isocyanatopropyltriethoxysilane, the component (D) used in Example 4, was omitted.

The cured samples for the H-tensile test as prepared above were subjected to the tensile strength test and the tensile characteristics and the mode of failure were compared to evaluate the adhesiveness to the adherend under non-primer conditions. The tensile strength test was performed in accordance with the method of tensile strength test as directed in JIS A5758-1992, using Shimadzu Autograph AG-2000A in a constant-temperature chamber at 23° C., 50±10% RH and a pulling speed setting of 50 mm/min.

TABLE 3

| No. | Silanol condensation catatyst (in parts) | Silicon compound (in parts) | Isocyanato-silane coupling agent (in parts) | Mode failure in adhesion test |
| --- | --- | --- | --- | --- |
| Ex. 4 | $(C_4H_9)_2Sn(OCH_3)_2$ (4 parts) | $(C_6H_5)_2Si(OCH_3)_3$ (0.5 parts) | $OCNC_3H_6Si(OCH_3)_3$ (4 parts) | Cohesive failure |
| Ex. 5 | $(C_4H_9)_2Sn(OCH_3)_2$ (4 parts) | $(C_6H_5)_2Si(OCH_3)_2$ (1.0 parts) | $OCNC_3H_6Si(OCH_3)_3$ (4 parts) | Cohesive failure |
| Compar. ex. 6 | $(C_4H_9)_2Sn(OCH_3)_2$ (4 parts) | $(C_6H_5)_2Si(OCH_3)_2$ (0.5 parts) | none (0 part) | Adhesion failure |

It can be seen from Table 3 that the non-primer adhesiveness with respect to aluminum was cohesive failure (CF) in both Examples 4 and 5, in which γ-isocyanatopropyltriethoxysilane (Y-9030), viz. an isocyanato-containing silane coupling agent as component (D) of the present invention, was added. In contrast, the result obtained in Comparative Example 6, in which Y-9030 was not used, was adhesion failure (AF).

It is, therefore, apparent that a curable composition comprising (A) a saturated hydrocarbon polymer having at least one reactive silicon group per molecule, (B) a tetravalent tin compound, and (C) a silicon compound of the general formula (1) shows a dramatically high curing rate. Furthermore, when this composition is supplemented with an isocyanato-containing silane coupling agent as component (D), the resulting composition shows high adhesiveness to various kinds of adherends.

INDUSTRIAL APPLICABILITY

The curable composition of the present invention provides for remarkable improvements in curing rate and adhesion to various adherends. Furthermore, the adhesiveness to various kinds of substrates can be improved when various additives are supplemented with the curable composition of the present invention. The curable composition of the present invention is particularly useful as a sealing agent for double glazing, an elastic sealant for applications requiring an unusually high curing rate, or as an electrical insulating material such as an insulating sheath material for conductors and cables.

What is claimed is:

1. A curable composition which comprises (A) a saturated hydrocarbon polymer having at least one silicon-containing group containing a hydroxyl or hydrolyzable group bound to the silicon atom and capable of forming a siloxane bond, (B) a tetravalent tin compound, and (C) a silicon compound of the general formula (1)

$$R^1_a Si(OR^2)_{4-a} \quad (1)$$

wherein $R^1$ and $R^2$ each independently represents a chlorine-substituted or unsubstituted hydrocarbon group containing 1 to 20 carbon atoms; a represents any of 0, 1, 2 and 3, and the tetravalent tin compound as component (B) being a tetravalent tin alcoholate represented by the general formula (3)

$$Q_d Sn(OZ)_{4-d} \text{ or } [Q_2Sn(OZ)]_2O \quad (3)$$

in which Q represents a monovalent hydrocarbon group containing 1 to 20 carbon atoms; Z represents a monovalent hydrocarbon group containing 1 to 20 carbon atoms or an organic group internally containing a carbonyl group; d represents any of 0, 1, 2 and 3; and wherein the saturated hydrocarbon polymer as component (A) contains a repeating unit derived from isobutylene in a proportion of not less than 50 weight %.

2. The curable composition according to claim 1, wherein the saturated hydrocarbon polymer as component (A) has a number average molecular weight of 500 to 50000 and contains at least one reactive silicon group of the general formula (2) per molecule within its molecular chain terminality and/or internally,

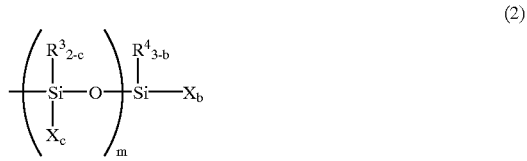

wherein $R^3$ and $R^4$ each independently represents an alkyl group containing 1 to 20 carbon atoms, an aryl group containing 6 to 20 carbon atoms, an aralkyl group containing 7 to 20 carbon atoms, or a triorganosiloxy group of the formula $(R')_3SiO-$, where the R' groups each independently represents an unsubstituted hydrocarbon group containing 1 to 20 carbon atoms; X groups each independently represents a hydroxyl group or a hydrolyzable group; b represents any of 0, 1, 2 and 3; c represents any of 0, 1 and 2; provided, however, that both b and c are not simultaneously equal to 0; m represents an integer of 0 or 1 to 19.

3. The curable composition according to claim 2, wherein X in the reactive silicon group of the general formula (2) represents an alkoxy group.

4. The curable composition according to claim 1, wherein $R^1$ in general formula (1) is an aryl group containing 6 to 20 carbon atoms.

5. The curable composition according to claim 1,
which comprises 0.1 to 20 weight parts of component (B) and 0.01 to 20 weight parts of component (C) relative to 100 weight parts of component (A).

6. A curable composition which comprises
(A) a saturated hydrocarbon polymer having at least one silicon-containing group containing a hydroxyl or hydrolyzable group bound to the silicon atom and capable of forming a siloxane bond,
(B) a tetravalent tin compound, and
(C) a silicon compound of the general formula (1)

$$R^1_a Si(OR^2)_{4-a} \qquad (1)$$

wherein $R^1$ and $R^2$ each independently represents a substituted or unsubstituted hydrocarbon group containing 1 to 20 carbon atoms; a represents any of 0, 1, 2 and 3,
and which comprises 0.1 to 20 weight parts of component (B), 0.01 to 20 weight parts of component (C) and 0.1 to 20 weight parts of an isocyanato-containing silane coupling agent as component (D), relative to 100 weight parts of component (A).

7. The curable composition according to claim 6,
wherein the saturated hydrocarbon polymer as component (A) has a number average molecular weight of 500 to 50000 and contains at least one reactive silicon group of the general formula (2) per molecule within its molecular chain terminally and/or internally,

$$(2)$$

wherein $R^3$ and $R^4$ each independently represents an alkyl group containing 1 to 20 carbon atoms, an aryl group containing 6 to 20 carbon atoms, an aralkyl group containing 7 to 20 carbon atoms, or a triorganosiloxy group of the formula $(R')_3SiO$— where the R' groups each independently represents an unsubstituted hydrocarbon group containing 1 to 20 carbon atoms; X groups each independently represents a hydroxyl group or a hydrolyzable group; b represents any of 0, 1, 2 and 3; c represents any of 0, 1 and 2; provided, however, that both b and c are not simultaneously equal to 0; m represents an integer of 0 or 1 to 19.

8. The curable composition according to claim 7,
wherein X in the reactive silicon group of the general formula (2) represents an alkoxy group.

9. The curable composition according to claim 6,
wherein the saturated hydrocarbon polymer as component (A) contains a repeating unit derived from isobutylene in a proportion of not less than 50 weight %.

10. The curable composition according to claim 6,
wherein the tetravalent tin compound as component (B) is represented by the general formula (3)

$$Q_d Sn(OZ)_{4-d} \text{ or } [Q_2 Sn(OZ)]_2 O \qquad (3)$$

in which Q represents a monovalent hydrocarbon group containing 1 to 20 carbon atoms; Z represents a monovalent hydrocarbon group containing 1 to 20 carbon atoms or an organic group internally containing a carbonyl group; d represents any of 0, 1, 2 and 3.

11. The curable composition according to claim 10,
wherein the compound of the general formula (3) is a tetravalent tin alcoholate.

12. The curable composition according to claim 6,
wherein $R^1$ in the general formula (1) is an aryl group containing 6 to 20 carbon atoms.

13. The curable composition according to claim 2,
which comprises 0.1 to 20 weight parts of component (B) and 0.01 to 20 weight parts of component (C) relative to 100 weight parts of component (A).

14. The curable composition according to claim 3,
which comprises 0.1 to 20 weight parts of component (B) and 0.01 to 20 weight parts of component (C) relative to 100 weight parts of component (A).

15. A curable composition which comprises
(A) a saturated hydrocarbon polymer having at least one silicon-containing group containing a hydroxyl or hydrolyzable group bound to the silicon atom and capable of forming a siloxane bond,
(B) a tetravalent tin compound, and
(C) a silicon compound of the general formula (1)

$$R^1_a Si(OR^2)_{4-a} \qquad (1)$$

wherein $R^1$ in general formula (1) is an aryl group containing 6 to 20 carbon atoms and $R^2$ represents a chlorine-substituted or unsubstituted hydrocarbon group containing 1 to 20 carbon atoms; a represents any of 0, 1, 2 and 3, and
the tetravalent tin compound as component (B) being a tetravalent tin alcoholate represented by the general formula (3)

$$Q_d Sn(OZ)_{4-d} \text{ or } [Q_2 Sn(OZ)]_2 O \qquad (3)$$

in which Q represents a monovalent hydrocarbon group containing 1 to 20 carbon atoms; Z represents a monovalent hydrocarbon group containing 1 to 20 carbon atoms or an organic group internally containing a carbonyl group; d represents any of 0, 1, 2 and 3.

16. The curable composition according to claim 15,
wherein the saturated hydrocarbon polymer as component (A) has a number average molecular weight of 500 to 50000 and contains at least one reactive silicon group of the general formula (2) per molecule within its molecular chain terminality and/or internally,

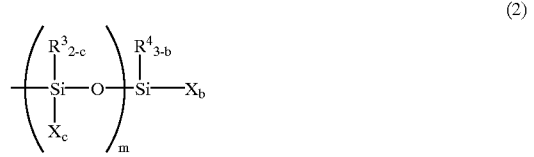

$$(2)$$

wherein $R^3$ and $R^4$ each independently represents an alkyl group containing 1 to 20 carbon atoms, an aryl group containing 6 to 20 carbon atoms, an aralkyl group containing 7 to 20 carbon atoms, or a triorga nosiloxy group of the formula (R')$_3$SiO—, where the R' groups each independently represents an unsubstituted hydrocarbon group containing 1 to 20 carbon atoms; X groups each independently represents a hydroxyl group or a hydrolyzable group; b represents any of 0, 1, 2 and 3; c represents any of 0, 1 and 2; provided, however, that both b and c are not simultaneously equal to 0; m represents an integer of 0 or 1 to 19.

17. The curable composition according to claim 16, wherein X in the reactive silicon group of the general formula (2) represents an alkoxy group.

18. The curable composition according to claim 15 which comprises 0.1 to 20 weight parts of component (B) and 0.01 to 20 weight parts of component (C) relative to 100 weight parts of component (A).

\* \* \* \* \*